United States Patent [19]

Müeller

[11] 4,037,053
[45] July 19, 1977

[54] AUTOMATIC TELEPHONE ANSWERING APPARATUS

[75] Inventor: Willy Müeller, Zollikon, Switzerland

[73] Assignee: Compur-Werk Gesellschaft mit beschrankter Haftung Co., Munich, Germany

[21] Appl. No.: 605,039

[22] Filed: Aug. 15, 1975

[30] Foreign Application Priority Data

Aug. 23, 1974 Switzerland .................... 11555/74

[51] Int. Cl.² ............................................ H04M 1/64
[52] U.S. Cl. .............................. 179/6 R; 179/100.11; 360/94; 360/137
[58] Field of Search .................... 179/100.11, 6 R; 360/94, 137

[56] References Cited

U.S. PATENT DOCUMENTS

| 3,521,010 | 7/1970 | Sato | 360/137 |
| 3,632,894 | 1/1972 | Bretschneider | 179/100.11 |
| 3,821,476 | 6/1974 | Godwin | 179/6 R |
| 3,877,072 | 4/1975 | Azimi | 360/94 |

*Primary Examiner*—Harold I. Pitts

*Attorney, Agent, or Firm*—Blanchard, Flynn, Thiel, Boutell & Tanis

[57] ABSTRACT

An automatic telephone answering apparatus having an announcement mechanism for playing an announcement message to a caller in response to a signal being received from the public telephone network indicating that the caller wishes to call the number to which the automatic telephone answering device is connected. The automatic telephone answering device has a housing containing circuitry for controlling the announcement text. The housing also has an empty space to receive a hand-operated dictating machine, which dictating machine has a tape mechanism therein for recording a message from the caller. Circuits are provided for controlling and sequencing the operation of the announcement text and the time period during which the caller can record information on the tape in the dictating machine. Thus, the use of the dictating machine is enhanced by permitting its use outside of the telephone answering environment as a dictating machine and also a use in the telephone answering apparatus for recording information from the caller.

6 Claims, 8 Drawing Figures

AUTOMATIC TELEPHONE ANSWERING APPARATUS

FIELD OF THE INVENTION

The present invention relates to an automatic telephone answering apparatus, comprising an announcement mechanism, which contains a magnetic sound carrier for receiving and playing back a call answering text and a mechanical drive assembly for said magnetic sound carrier, comprising an operating switch and further switching members for selecting certain types of operations, and comprising electric switching, amplifying and control means for automatically controlling the sequence of operation of the apparatus in the various modes of operations.

BACKGROUND OF THE INVENTION

In such known apparatus, the caller receives a timewise limited piece of recorded information from the called party by playing back the call answering text recorded on a magnetic sound carrier, such information being for example the duration of his absence, office hours information, a second or emergency address, etc. However, apparatus of the above-mentioned type, which can be designed relatively simple, are not able to store information from the caller, for example an order for merchandise, an urgent reply, etc., for the purpose of a later play-back by the called party, because a suitable storage section with the necessary control and switchover members is missing.

Often exists the desire to be able to record and to store with the help of an apparatus of the above-mentioned type at times information which is received through the telephone line during a call, without the necessity of requiring a purchase of a relatively expensive apparatus with a built-in storage section, which is used only very little.

It is already known for recording information arriving through the telephone line to connect to the apparatus for answering the telephone a tape recorder, in particular one of the amusement electronics. Such a solution has, however, the disadvantages of a vague switching having floating lines and an insufficient control over the tape recorder through the call answering apparatus, so that meeting the strict regulations of the telephone authorities is hardly possible or only at a great expense.

The purpose of the present invention is to work around the listed disadvantages and to produce an apparatus for automatically answering a telephone, which permits in particular the occasional storage of arriving information in a simple manner, without electric installation operations and by meeting completely the official regulations as to the construction and the use of call answering apparatus.

Inventively, the apparatus for automatically answering a telephone of the above-mentioned type is characterized by one housing part of the apparatus having an empty space for receiving a hand dictating machine, which contains a recording mechanism with a further magnetic sound carrier and a drive assembly for the further magnetic sound carrier, a control switch which is manually operable and has a switch position, in which a text spoken into a microphone is recorded on the further magnetic sound carrier, and two contact sockets of which the first one is provided for connection of a microphone and the second one for connection of an external supply voltage source, by arranging on an inner boundary of the mentioned space each one contact jack for the first or second contact socket and by providing control and switching members for guiding information which arrives from a connected telephone line to the first contact jack and a supply voltage to the second contact jack during at least one part of the time duration of the arriving information, in order to store the arriving information on the further magnetic sound carrier of the hand dictating apparatus.

Since such a hand dictating machine is being used only during a relatively short period of time as a dictating machine, its present use as a storage section for a pure call answering apparatus does not illustrate a limitation, but rather a better utilization of the dictating machine. However, it permits parties, which desire only in a limited degree, to record arriving information, without additional expense, without technical knowledge and without the necessity of vague connecting lines to immediately supplement the call answering apparatus with the storage function or afterward to use the hand dictating machine without changeover or the like in its actual function.

BRIEF DESCRIPTION OF THE DRAWINGS

One exemplary embodiment of the subject matter of the invention will be discussed hereinafter in connection with the drawings, in which.

DETAILED DESCRIPTION

Figure 1:
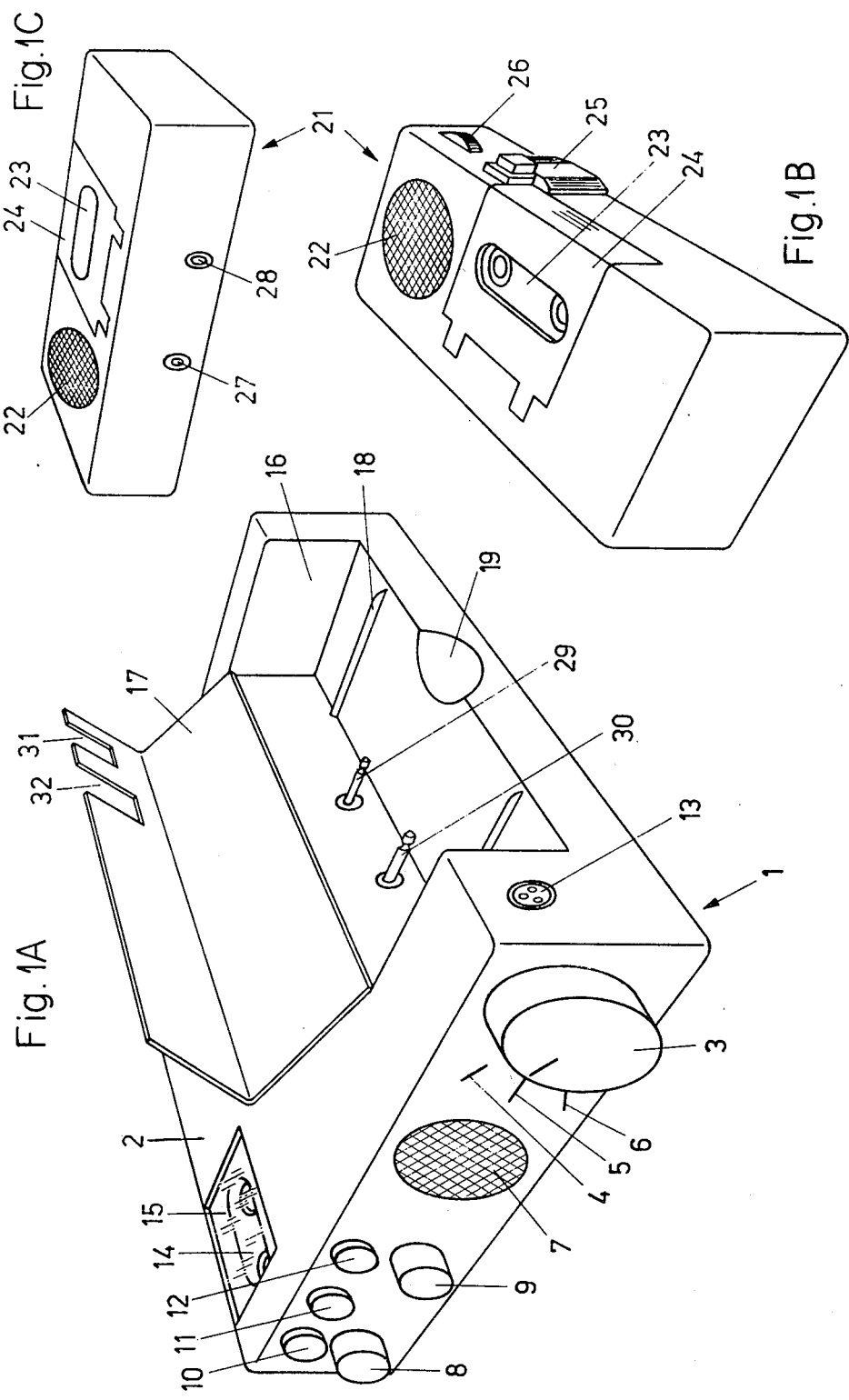
FIG. 1A is a perspective view of an automatic telephone answering apparatus.
FIG. 1B is a perspective view of a dictating machine used together with the telephone answering apparatus.
FIG. 1C is a perspective view of a dictating machine showing the back side thereof.

The automatic telephone answering apparatus 1, which is illustrated in a perspective view in FIG. 1A, has a housing 2, the upper side of which has a surface for storage of a telephone. The front side of the apparatus has various operating and indicating members. An operating switch 3 has three switch positions 4, 5 and 6. The first position 4 connects the apparatus to the public telephone network to automatically respond to calls by means of a sound carrier. The second position 5 permits a listening to the announcement text prior to it being transmitted onto the public telephone network for control purposes. The third position 6 permits a recording of the text onto the mentioned sound carrier. A loudspeaker 7 is provided for broadcasting the announcement text that exists on the sound carrier when the switch 3 is in the switch position 5 so that the sound level can be adjusted. A sound lever control 8 facilitates this adjustment and is combined with a master switch for switching the apparatus on and off. The illustrated apparatus has furthermore a key switch 9, namely a starting key, which is used to control the advance of the sound carrier and to record, during recording of the announcement text, sound markings on the sound carrier of the announcement text, all of which will be described in detail hereinbelow.

Furthermore, three signal lamps 10, 11, 12 are provided. The first, for example, is a yellow lamp 10 and lights up when the apparatus is ready to be used. The second, for example is a green lamp 11 and lights up when the switch 3 is in the first position 4, namely when the apparatus is connected to the public telephone network for the purpose of receiving calls. The third, for example, is a red lamp 12 and lights up when the manual dictating apparatus, which will be described hereinafter, is inserted into the apparatus 1 for recording information being received from a caller.

The existing apparatus has furthermore a socket 13 mounted on a sidewall for receiving a microphone jack for permitting a recording of the announcement text onto the respective sound carrier. The microphone has a conventional switch to control the advance of the announcement sound carrier by switching the advance on and off.

The present apparatus can be connected on its back side with the public telephone network or the telephone apparatus.

The present apparatus uses as a sound carrier for the announcement text a magnetic tape which is contained in a cassette 14. The cassette 14 can, after opening of a lid 15, which is arranged on the housing 2, be placed into the apparatus or can be removed from same. Preferably, a cassette is used which is already known for use in dictating machines. These cassettes have very small dimensions and a recording or play-back time of approximately 15 minutes on each side of the tape.

As can be seen from FIG. 1A, the telephone answering apparatus has an empty chamber 16 which is inside of the housing 2 and access is available from the outside by opening a closable lid 17. The dimensions of the empty chamber 16 correspond to the size of the manually operated dictating machine 21 illustrated in FIGS. 1B and 1C. The dictating machine 21 can be moved on ribs 18 into the telephone answering apparatus, after an opening of the lid 17, and can be removed therefrom through a use of a finger recess 19.

The manually operated dictating apparatus 21 has a microphone 22 built into its upper side to record onto a magnetic tape contained in a small cassette 23 which is located under a protective lid 24. The microphone 22 is used simultaneously as a loudspeaker when a play-back occurs of the recorded text. A hand operated switch 25 is arranged on one side of the dictating machine. A movement of the switch in one direction and a simultaneous pressing in thereon permits a recording of the text spoken into the microphone 22. A movement of the switch 25 into a different position effects a play-back of the recorded text. A simultaneous pressing on the switch effects a quick advance of the magnetic tape and through a further movement of the switch into a further switched position, a quick return of the magnetic tape is effected. On the same narrow side, a sound level control 26 is provided which is effective during a play-back of the recorded text.

The opposite narrow side of the dictating machine has two contact sockets 27 and 28 of a coaxial structure and, for the purpose of avoiding confusion, of different diameter. The contact socket 27 is used to connect an external microphone or an earpiece so that when a jack is plugged into the socket 27 the self-contained microphone 22 is switched off. The other socket 28 is used to connect the dictating machine to an external source of voltage, for example, a power supply unit, so that when a jack from an external power source is plugged into the socket 28, a battery, for example, a 9 volt dry cell battery, which is installed in the dictating machine 21, is also switched off.

Figure 2:
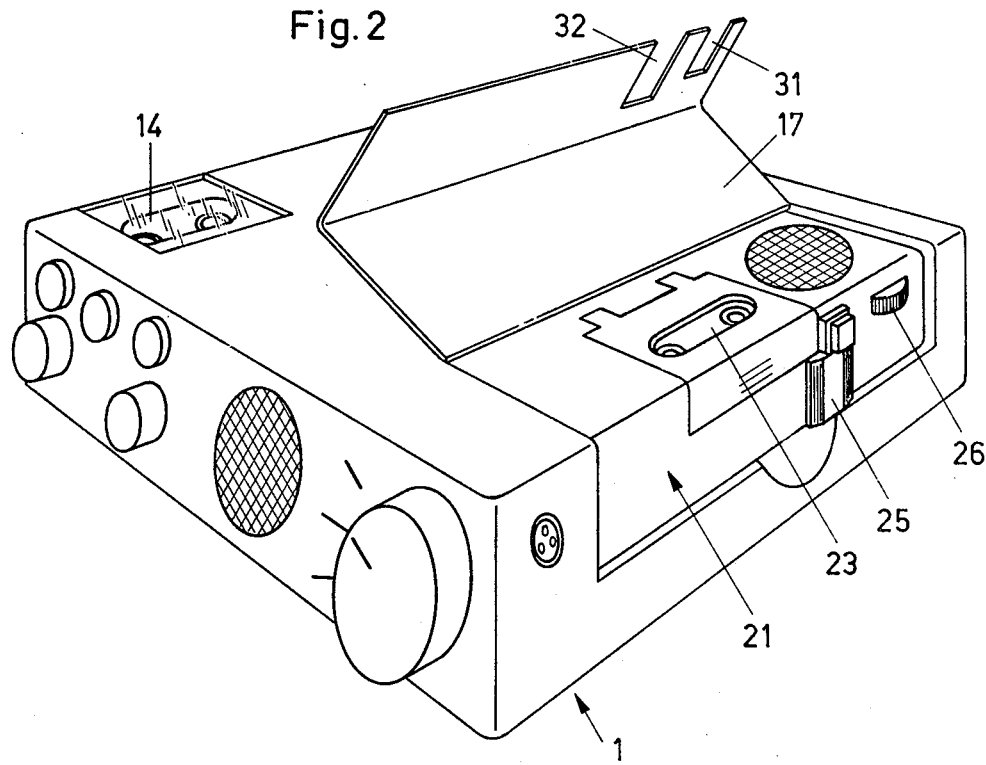
FIG. 2 is a perspective view of the answering apparatus of FIG. 1A having the dictating machine of FIGS. 1B and 1C inserted therein and the lid being in the opened condition.
Figure 3:
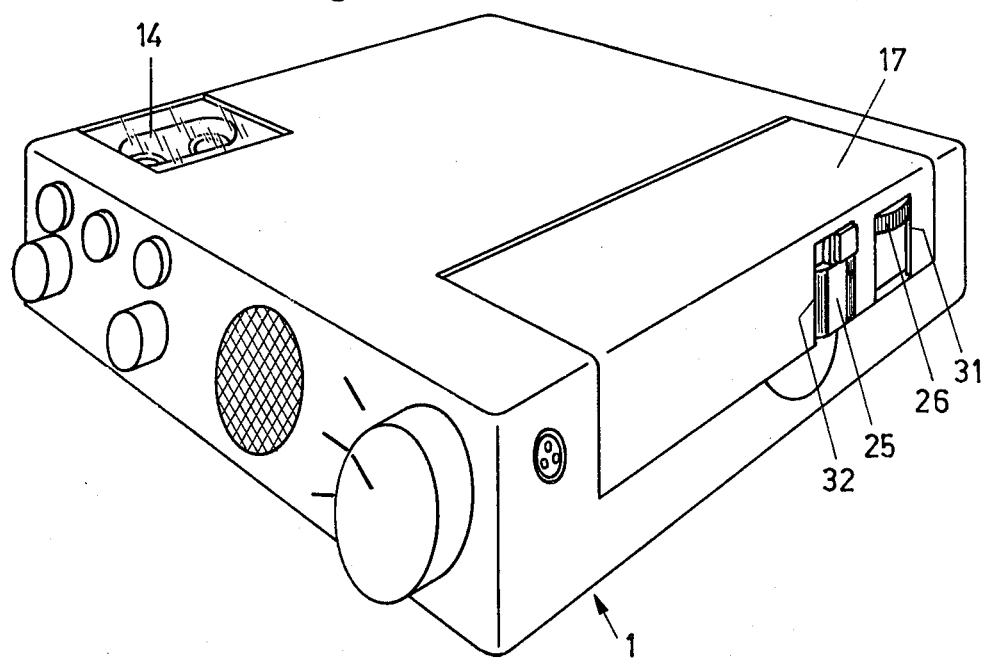
FIG. 3 illustrates the answering and dictating machine of FIG. 2 with the lid being in the closed position.

One wall of the chamber 16 has two projecting, each double pole, contact jacks 29 and 30 which correspond in diameter to the diameter of the contact sockets 27 or 28. When the dictating machine 21 has been inserted into the chamber 16, both the microphone 22 of the dictating machine and also its internal supply voltage source are switched off and the contact jack 29 is connected to the microphone circuit and the contact jack 30 is connected to the supply voltage circuit of the telephone answering apparatus 1. This combination is illustrated in FIGS. 2 and 3. In order to be able to close the lid 17, the lid 17 has a first cutout 31 for the sound level control 26 and a second cutout 32 for the hand switch 25. The latter cutout 32 is constructed so that the lid 17 can only be closed, when the hand switch 25 is in the position for receiving a spoken text. Since the internal supply voltage source of the dictating machine 21 is turned off when the dictating machine is inserted, the dictating machine remains in its off condition as long as the contact jack 30 of the telephone answering apparatus 1 conducts no corresponding supply voltage. FIG. 3 illustrates the described apparatus with the lid 17 being in the closed position. It can be seen that the appearance of the telephone answering apparatus 1 on the outside does not differ much from the normal appearance of the apparatus without the dictating machine inserted therein.

The various types of operations of the present telephone answering apparatus will be described hereinafter, namely first as a pure answering apparatus and secondly as an answering apparatus with a recording of information dictated by a caller with the use of the inserted dictating machine 21.

In the first case, in order to record an announcement text on the magnetic sound carrier of the inserted cassette 14, the apparatus 1 is connected to a power supply, and the microphone jack is inserted into the socket 13. The operating switch 3 is rotated into the third position 6. In the situation where the cassette 14 is inserted into the recess therefor, and after the apparatus has been switched on by means of the master switch 8, the yellow lamp 10 lights up brightly. Subsequently, the starting key 9 or a starting key corresponding to it and provided on the microphone is pressed down. As soon as the yellow lamp 10 goes out, the announcement text can be spoken into the microphone. When the announcement text is finished, one must wait until the apparatus automatically brings the cassette 14 into reverse run. Recording of the announcement text is finished, as soon as the yellow lamp 10 burns brightly again.

To play-back the recorded announcement text for the purpose of checking same, the operating switch 3 is rotated into the second position 5, and at an ignition of the yellow lamp 10, the starting key 9 is depressed. The entire tape storage in the cassette 14 (approximately 60 seconds) is played back through the loudspeaker 7 so that the sound level can be adjusted by the control 8. The return of the tape in the cassette 14 is done automatically.

For the telephone answering operation, the operating switch 3 is rotated into the first position 4. The apparatus is ready for operation, when the yellow lamp 10 lights up brightly and the green lamp 11 lights up simultaneously to acknowledge this switch position. After a call signal is received from a telephone, the apparatus is started and it starts to transmit the recorded announcement text onto the public telephone network. The entire tape storage of the cassete 14 (approximately 60 seconds) is played back. After the end of the tape is reached, the public telephone network is disconnected and the tape runs back internally into its initial position. The apparatus is advantageously protected against blocking of the tape feed or tape tears. If a malfunction should occur, a further telephone answering function is made impossible by an internal blockage. The apparatus no longer answers.

In the second situation, in which a recording of arriving information takes place with the help of an inserted dictating machine 21, first the recording of an announcement text with a request to speak takes place. For this purpose, the apparatus 1 is again connected to the power supply, the microphone jack is inserted into the socket 13, the operating switch 3 is rotated into the third position 6 and the apparatus is turned on by means of the master switch 8. When the cassette 14 is inserted, the yellow lamp 10 lights up brightly. A first part of an announcement text is now spoken onto the tape after depressing the starting key 9 or a corresponding key on the microphone and subsequently an extinguishment of the yellow lamp 10 occurs. The first text part must be at least 15 seconds and at most 26 seconds in duration and finishing with the instruction "please speak now". After this the starting key 9 is depressed again, whereby a signal tone can be heard lasting for approximately one-half second. Immediately after the automatic end of the signal tone, the final statement is spoken onto the tape, which is supposed to end according to regulation with the information "apparatus turns off" and may not exceed a duration of five seconds. Immediately after the finish of the final statement, the starting key 9 is pressed again, whereby a new signal tone lasting for approximately one-half second can be heard. The return of the tape in the cassette again takes place automatically, after which an illumination of the yellow lamp 10 indicates the end of the recording operation.

The control play-back of the recorded announcement text in the position 5 of the operating switch 3 and through the loudspeaker 7 takes place in the already described manner.

The operating switch 3 is rotated into the position 4 for the telephone answering operation. The apparatus is ready for this operation when the yellow lamp lights up brightly and the green lamp lights up as acknowledgement of the switch position and the red lamp 12 lights up as acknowledgement that the dictating machine 21 is inserted into the telephone answering apparatus 1. However, in this manner, a recording of the caller's message with the dictating machine is made possible. After sending out the announcement text with the request to speak, after the first signal tone is heard, the dictating machine 21 is switched on automatically for 30 seconds. Spoken information or line noises in the telephone line are, during this time, recorded on the tape of the dictating machine. After 30 seconds of recording time, the final statement with the information "apparatus turns off" is sent. After the second signal tone is heard, the telephone answering apparatus 1 is automatically moved into return run and the telephone network is separated from the apparatus. After a return into the initial position, the apparatus 1 is then ready for further telephone calls.

If during the operation of the telephone answering apparatus 1 without a recording of arriving information, namely without the inserted dictating machine 21, erroneously the cassette was inserted with the announcement text containing a request to speak, immediately after the request to speak, the final statement is transmitted onto the telephone line by the apparatus 1. This is intended to keep the calling party from leaving an information.

Two types of announcement text, namely without and with requests to speak, are each recorded advantageously onto one-half of the tape track of the same cassette 14, so that by choosing the side with which the cassette 14 is inserted into the apparatus 1, the one or the other announcement text can be chosen.

A switching arrangement for implementation of the aforedescribed operations will be discussed hereinafter in connection with the block circuit diagram of FIG. 4 and the individual diagrams of FIGS. 5 and 6.

The present exemplary embodiment of the automatic telephone answering apparatus has several analogous function groups and one digital block. The analogous function groups produce digitally variable signals, which control the digital block or are controlled by it. Thus in the switching arrangement there exits, on the one hand, signals or signals are produced, which have the meaning of input variables and, on the other hand, such signals, which have the meaning of output or control variables so that in both cases these signals are digital signals, namely of two levels, one being high and the other being low. The function of the signals is indicated by abbreviated identifications in the block diagram of FIG. 4, whereby the identifications for the input variables are each in a round box and the ones for the control variables are each in a square box. Signal identifications without a dash indicate a high level and such with a dash indicate the low level. The input variables and the control variables are connected through the mentioned digital block which is not illustrated in FIG. 4. The digital block, which is designed as a synchronously sequential digital circuit and is constructed as an integrated circuit in MOS-technique, is hereby controlled by a certain pulse frequency of for example 100 Hz. Details of such a switching arrangement having a digital block in an apparatus for automatically answering telephone calls are described in Swiss Pat. No. 557,121 (U.S. application Ser. No. 382,067).

Figure 4:
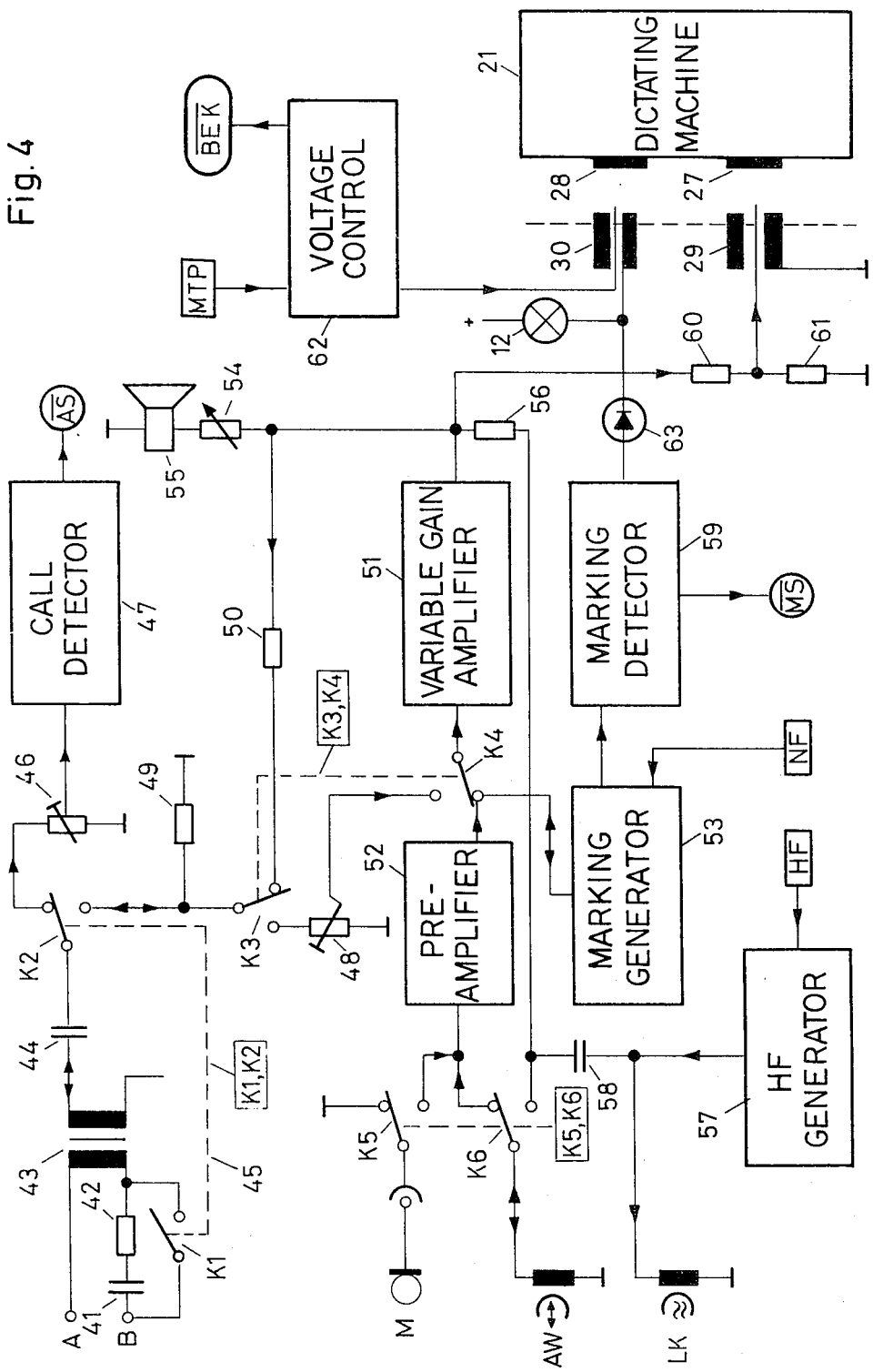
FIG. 4 illustrates a block electrical circuit diagram of the answering apparatus.

According to FIG. 4, the a.c. signals from a public telephone network are connected at A,B to one coil of a line transformer 43 through a capacitor 41 and a resistor 42 which is series connected to said capacitor. For the galvanic connection of the public telephone network terminals A,B with the transformer 43, a relay contact K1 is provided, the associated relay of which, together with the control circuit, is not illustrated in FIG. 4. On the other coil of the transformer 43 there lies above a capacitor 44 a further relay contact K2, which is constructed as a changer and the associated relay of which with the control circuit is also not illustrated. The relays with the contacts K1 and K2 are energized by the same control voltage, which is indicated by the boxed-in control variables K1,K2, so that the switch motion of the contacts K1 and K2 takes place simultaneously, which is indicated by a dashed line 45. In the normal position, the contact K2 connects the other coil of the transformer 43 to a potentiometer 46, at the tap of which is connected the inlet terminal to a call detector 47. The potentiometer 46 is used to adjust the control resolution of the call detector 47, which after reaching the switching threshold produces a control signal AS for the digital block through the ringing signal.

In the operating position of the relay contact K2, the other coil of the transformer 43 is connected to a switch-over part, which has two relay contacts K3 and K4 constructed as changers and a potentiometer 48. In the normal position of the contacts K3 and K4, the transformer 43 and thus the telephone network A,B are connected through a voltage divider, which consists of the resistors 49 and 50, to the output of a variable-gain amplifier 51, so that the input signal of the variable-gain amplifier 51, which exists in the normal position of the contact K4 is amplified and connected to the telephone network. In the operating position of the contacts K3 and K4, the telephone network A,B is connected to the input of the variable-gain amplifier 51 through the transformer 43 and the tap of the potentiometer 48, so that a sound signal which arrives through the telephone network, in particular a language signal, is amplified in the variable-gain amplifier 51. The relays which belong to the contacts K3 and K4 are not illustrated and are controlled by the control variables K3,K4 which are indicated in a box.

In the normal position of the contact K4, the input to the variable-gain amplifier 51 is connected to the output of a preamplifier 52, which output in addition is connected to the input of a marking generator 53. To the input of the preamplifier 52 are connected two further relay contacts K5 and K6 which are constructed as changers and the associated relay of which is not illustrated, whereby the latter is controlled by the control variables K5,K6 which are arranged in a box. In the operating position of the contact K5 and K6, a microphone M is connected to the input of the preamplifier 52. In this contact position, the talking voltages of the microphone M are transmitted through the preamplifier 52 to the input of the variable-gain amplifier 51.

In the illustrated normal position of the contacts K5 and K6, the input of the preamplifier 52 is connected through the relay contact K6 to a combination recording and play-back sound head AW for the announcement tape. This sound head has associated with it an erase head LK for the announcement tape. The signal received by this sound head is amplified and supplies the input to the variable-gain amplifier 51 and the input of the marking generator 53. An adjustable resistor 54 which is provided as a sound level control is connected to the output of the amplifier 51, aside from other circuit parts, which will be discussed hereinbelow. The resistor 54 corresponds with the control 8 in FIG. 1. A loudspeaker 55 is connected to the resistor 54, which corresponds to the loudspeaker 7 in FIG. 1. In the illustrated normal position of the relay contact K6, the announcement text which is spoken onto the announcement tape can be tapped for control purposes in the loudspeaker 55, for which purpose the function switch 3 of FIG. 1 must be moved into the third position 6, or it is possible to transmit this announcement text to reply to a call onto the telephone network A,B, for which purpose the mentioned function switch must be moved into the first position 4. During a recording of the announcement text, the microphone M is connected through the contact K5 to the input of the preamplifier 52. The preamplified language signal is transmitted through the contact K4 the input of the variable-gain amplifier 51. From the output of the variable-gain amplifier 51, the language signal which is amplified to a uniform level is transmitted through a resistor 56, the relay contact K6, which guides the language signal in its operating position to the combination recording and play-back sound head AW for the announcement tape. In addition, a HF-generator 57 is provided, which is controlled through a control variable HF into the oscillating condition. The full output voltage of the HF-generator 57 is fed to the erase head LK of the announcement tape for the purpose of erasing the preceding announcement text. A high-frequency partial voltage which is shunted through a capacitor 58 is added to the language signal for the purpose of HF-premagnetization of the announcement tape.

The marking generator 53 has in the present example an active filter circuit, whereby the feed-back branch can be controlled by a control variable NF such that when the control variable NF exists the active filter circuit oscillates with a frequency of approximately 1700 Hz, however, when the control variable NF is missing, it forms a selective amplifier for the mentioned frequency. In the case of recording the announcement text and with existing control variable NF, the line 53A of the marking generator 53, which line is connected to the output line of the preamplifier 52, is its output line. The control variable NF is produced by operating the starting key 9 (FIG. 1) on the apparatus or a corresponding starting switch on the microphone after a recording of the first or second part of the announcement text is finished, as has already been discussed.

During the play-back of the text of the announcement tape for the purpose of transmitting the announcement text onto the telephone network, a complete signal path from sound head AW through the preamplifier 52, the variable-gain amplifier 51 and the voltage divider 49,50 to the transformer 43 exists through the contacts K6 and K4 in the illustrated normal positions, the contact K3 in its normal position and the contact K2 in its operating position. The output signal of the preamplifier is transmitted also to the marking generator 53, whereby in the existing operating mode (operating switch 3 of FIG. 1 in the first position 4), the control variable NF for the marking generator 53 is missing, so that same acts as selective amplifier. Since the signal which is played back by the announcement tape contains a fixed frequency, which is at 1700 Hz, namely the afore-recorded marking signal, only same is amplified in the marking generator 53. A marking detector 59 which is connected to the marking generator determines the appearance of such a marking signal and forms from this a digital output signal MS which has the earlier-mentioned lower level, when a marking signal has been determined. This output signal is used as an input variable for the not illustrated digital block.

The switching arrangement which has been described so far relates to an apparatus for exclusively answering a telephone call, however, with marking means for recording of sound signals on the announcement tape for the purpose of controlling a storage section, not illustrated in the present apparatus, for recording information arriving through the telephone line during a call. Further necessary or provided circuit parts, as for example the motor control for the drive assembly, time switch, control circuits for relays and signal lamps, etc. are here, however, not mentioned in detail, rather reference is made to the aforementioned Swiss patent.

FIG. 4, however, illustrates further circuit parts, which are used to describe the hand dictating machine 21 (FIG. 1) as a storage section for arriving information together with the telephone answering apparatus 1.

FIG. 4 schematically illustrates the two double-pole, coaxial contact plugs 29 and 30 of FIG. 1, which during insertion of the dictating machine 21 are guided automatically into the contact socket 27 or 28. As further mentioned, the contact socket 27 is connected to the microphone circuit of the dictating machine 21 and the contact socket 28 to its supply voltage circuit. The one pole of the coaxial plug 29 is connected to ground and the other pole to a voltage divider which is formed of two resistors 60 and 61 and which is connected to the output of the variable-gain amplifier 51. Thus, the output signal of the variable-gain amplifier 51 is fed through the jack 29 and the socket 27 to the microphone circuit of the dictating machine 21 and thus, during a switched-on or supplied supply voltage, to its recording amplifier and recording sound head. Simultaneously therewith, a connection of the ground of the dictating machine 21 with the ground of the telephone answering apparatus takes place through the socket 27 and the jack 29.

The one pole of the coaxial jack 30 is connected to the output of a voltage control 62 which delivers the operating voltage for the dictating machine 21, which is fed to same through the socket 28 when a logic signal MTP exists, which is sent by the not illustrated digital block. This operating voltage causes the dictating machine to carry out all functions which are required for recording the sound signals supplied through the socket 27, because, as above-mentioned, the operating switch 25 of the dictating machine (FIG. 1) had to be moved into the recording position during insertion of the dictating machine or prior to a closing of the lid 17. The other pole of the plug 30 is not directly connected to the ground of the telephone answering apparatus, but only through the socket 28, an internal connection in the dictating machine 21, the socket 27 and the jack 29. However, the other pole of the plug 30 is connected to the one connection of the red signal lamp 12, the other connection of which is connected to a supply voltage. Thus, the lamp 12 lights up when the dictating machine 21 is inserted and the telephone answering apparatus is switched on. Further, the other pole of the plug 30 is connected through a diode 63 to a control connection of the marking detector 59. Through this the marking signal MS of the marking detector 59 is switched during an existing sound signal only and when the diode 63 has become conductive due to the insertion of the dictating machine 21 caused by the jack 30, the sockets 28,27 and the jack 29 becoming connected to the ground. This prevents the situation when the announcement text containing the request to speak followed by a recording interval (namely the sound signals) is mistakenly placed into the apparatus, however, not the dictating machine 21.

Figure 5:
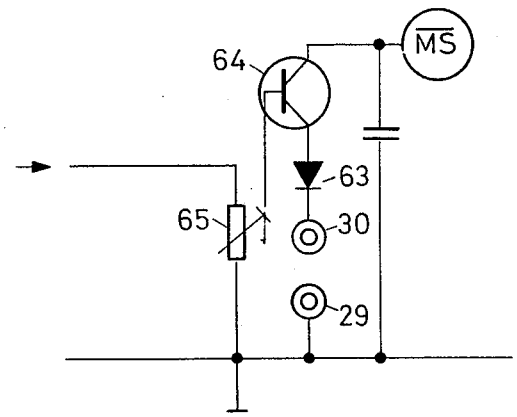
FIG. 5 and FIG. 6 illustrate two circuit details of the block circuit diagram of FIG. 4 for controlling the inserted dictating apparatus.
Figure 6:
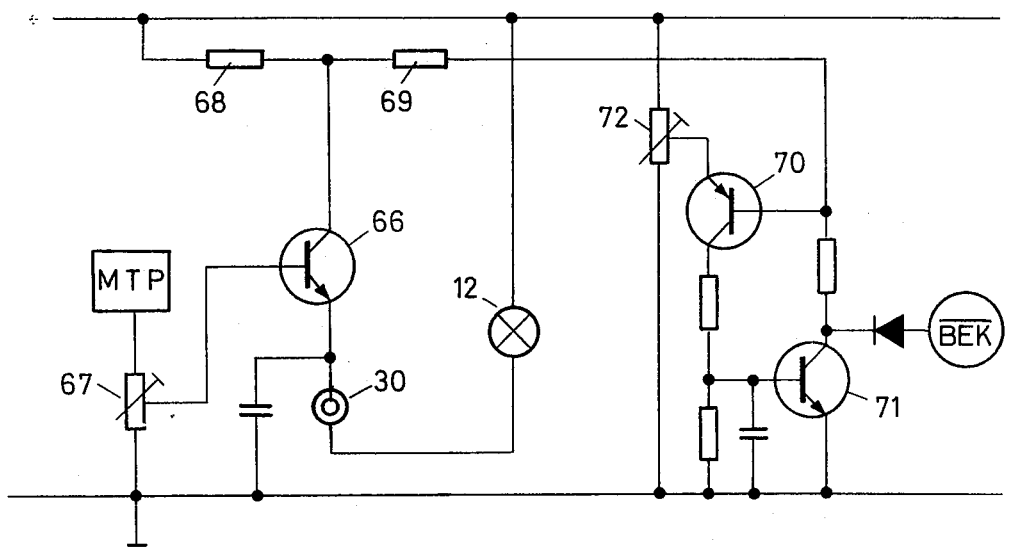

Practical embodiments of the circuit parts connected to the contact plug 30 in FIG. 4 are illustrated in FIGS. 5 and 6. FIG. 5 illustrates the circuit diagram of the output circuit of the marking detector 59, which contains a transistor 64, to which are transmitted the sound signals, which are filtered out earlier in the nonoscillating marking generator 53 and are further filtered out in the marking detector 59 and are recorded on the announcement tape through a potentiometer 65 for adjusting the switch point. The produced marking signal MS appears at the output of the transistor 64, but only when the diode 63, which is connected to the emitter of the transistor 64, is connected through the jacks 30 and 29 and the sockets 28 and 27 of the inserted dictating machine 21 (FIG. 4) to the mass and thus is current conducting.

FIG. 6 shows the circuit diagram of the voltage control 62 (FIG. 4) including the circuit of the red signal lamp 12. A transistor 66 controls the dictating machine as soon as through a potentiometer 67 the logic signal MTP is present. The operating voltage of the dictating machine is adjusted with the potentiometer 67, for example to 9 volts. The one pole of the jack 30 is connected to the emitter of the transistor 66, while the other pole of the jack 30, as already mentioned, is connected to one side of the signal lamp 12 and which, on the other side thereof, is connected to a positive supply voltage.

The transistor 66 is fed through a resistor 68 at its collector, to which is connected through a further resistor 69 a flipflop including transistors 70 and 71, the threshold voltage of which flipflop can be adjusted by means of a potentiometer 72. At a relatively great tape pull on the magnetic tape in the cassette 23 (FIG. 1) provided in the dictating machine 21 or at an exhausted capacity of the cassette 23, there occurs an increased current consumption by the dictating machine. Thus, the voltage drop at the resistor 68 is increased, namely the collector voltage of the transistor 66 drops so that the flipflop 70,71 switches. As soon as the flipflop 70,71 switches, namely the transistors 70,71 become current conducting, the input variable BEK which is fed to the digital block is switched and signals a tape interference or the end of the tape in the dictating machine. A control variable which is correspondingly emitted by the digital block blocks in the sequence the telephone answering apparatus 1. Since the flipflop 70,71 locks itself, the variable BEK remains in existence, and the apparatus 1 remains blocked. Only by switching off and then again on the telephone answering apparatus 1 after overcoming the tape interference in the dictating machine 21, or after inserting a new cassette, is the flipflop 70.71 reset through which the apparatus 1 is again ready for operation.

In the described exemplary embodiment, in the apparatus 1 for automatically answering a telephone, the control commands for the various switching, control and amplifying members are produced by means of a central digital block. However, it is also possible to construct apparatus with other control circuits in a simple manner so that they transmit for the inserted dictating machine in the time intervals, in which the calling party transmits information, an operating voltage and a language signal which corresponds to the information. It is also possible to provide other dictating machines than the described one. Since practically all manually operated hand dictating machines have a socket for connection to an external microphone and a socket for connection to an external supply voltage source, any modification of the used hand dictating apparatus is not necessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination (1) a portable dictating machine having a first housing, first magnetic tape cartridge receiving means in said first housing, a combination microphone and speaker mounted in said first housing for recording and playing back information on a magnetic tape cartridge in said first receiving means therefor, manually operable control means on said first housing movable between first and second positions for effecting a recording function in said first position and a playback function in said second position, auxiliary microphone connection means and auxiliary power receiving connection means mounted on said first housing and (2) a telephone answering apparatus having a second housing, a second magnetic tape cartridge receiving means in said second housing, microphone receiving socket means on said second housing and second manually operable control means for effecting a recording and a playback of information on a magnetic tape cartridge in said second receiving means, chamber means in said second housing and a closure member therefor, said chamber means having a dimension to receive the entirety of said dictating machine therein and effect a closing of said closure member, said closure member having means defining an opening therein to receive when said closure member is closed said control means on said dictating machine therein only when said control means is in said first position, said telephone answering apparatus including a power supply in said second housing and microphone connection means and power supply connection means in said chamber means and being coupled to the respective ones of said auxiliary microphone connection means and auxiliary power receiving connection means on said dictating machine when said dictating machine is received in said chamber means, said telephone answering apparatus having call detecting means for detecting an incoming telephone call on a telephone line and first switch means for effecting a playback of information on said second magnetic tape to the incoming caller and second switch means responsive to the end of the playback information only when said closure member is closed for effecting a recording of information from the incoming caller on said first magnetic tape.

2. The combination according to claim 1, wherein said microphone connection means and said power supply connection means each consist of a contact jack having a double-pole one pole of which is a ground pole, whereby the ungrounded pole of the contact jack which is connected to said auxiliary microphone connection means of the hand dictating machine, said second switch means comprising a variable-gain amplifier connected to the telephone line, the ungrounded contact jack which is connected to said auxiliary power receiving means of the hand dictating machine is connected to said power supply and of the two grounded poles of the contact jacks only the contact jack which is connected to said auxiliary microphone connection means is directly connected to a ground on said telephone answering apparatus, the other contact jack becoming connected to said ground on said telephone answering apparatus only when said hand dictating machine is received in said chamber means.

3. The combination according to claim 2, wherein the grounded pole of the contact jack which is connected to said auxiliary power receiving means of the hand dictating machine is connected to one side of a signal lamp on said second housing, the other side of said signal lamp being connected to said power supply so that the signal lamp will light up only when the hand dictating apparatus is received in said chamber means.

4. The combination according to claim 1, wherein said telephone answering apparatus has marking generator means for recording onto said second magnetic tape a signal of designated frequency and marking detector means for detecting said signal of designated frequency and effecting a supply of power to said auxiliary power receiving connection means.

5. The combination according to claim 2, wherein said power supply contains a switch for switching off the power supply voltage on a supply line which is connected to the ungrounded contact jack which is connected to said auxiliary power receiving connecting means of the hand dictating machine in response to the current intensity of the supply voltage.

6. The combination according to claim 5, wherein said switch is constructed as a self-locking flipflop, which is connected parallel with an adjustable resistor which lies in a supply voltage line, for example a transistor.

* * * * *

UNITED STATES PATENT AND TRADEMARK OFFICE
CERTIFICATE OF CORRECTION

PATENT NO. : 4 037 053
DATED : July 19, 1977
INVENTOR(S) : Willy Mueller

It is certified that error appears in the above-identified patent and that said Letters Patent are hereby corrected as shown below:

Change spelling of inventor "Müeller" to -- Mueller --.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*